United States Patent [19]

Hwang

[11] Patent Number: 5,151,829

[45] Date of Patent: Sep. 29, 1992

[54] KINETIC ART ARTICLE ASSEMBLY WITH STACKED COLOR FILTERS

[76] Inventor: Ren-Yi Hwang, 2nd Floor, 9-1, Lane 161, Hsing An Road, Sec. 1, Tachung, Taiwan

[21] Appl. No.: 722,237

[22] Filed: Jun. 24, 1991

[51] Int. Cl.⁵ .................. G02B 5/24; G04F 13/24
[52] U.S. Cl. .................. 359/886; 359/890; 40/406; 40/407
[58] Field of Search .......... 359/886, 890; 40/406, 40/407

[56] References Cited

U.S. PATENT DOCUMENTS

| | | | |
|---|---|---|---|
| 3,405,464 | 10/1968 | Simson | 40/407 |
| 3,413,744 | 12/1968 | Bowles | 40/407 |
| 3,638,342 | 2/1972 | Winslow et al. | 40/406 |
| 3,706,149 | 12/1972 | Olivieri | 359/886 |
| 3,731,412 | 5/1973 | Winslow et al. | 40/406 |

Primary Examiner—Jon W. Henry

[57] ABSTRACT

A kinetic art article assembly with stacked color filter comprises a base, two support plates, a cylindrical main body with a front main body and a rear main body, a fluid governor, and a drive mechanism. At least a set of plate assembly is disposed in the front main body and the rear main body. The plate assembly has a front plate, a flat plate and a rear plate. Each of the flat plate and the rear plate has a tube thereon so that liquid in the tube can flow in to the recesses of the front plate or the rear plate.

5 Claims, 8 Drawing Sheets

KINETIC ART ARTICLE ASSEMBLY WITH STACKED COLOR FILTERS

BACKGROUND OF THE PRESENT INVENTION

The present invention relates to an art article assembly and more particularly to a kinetic art article assembly with stacked color filters.

There are several sandglass types of flowing art articles. One type of flowing art articles provides colored sand which flows in a sandglass. When a user turns the sandglass upside down, the colored sand will flow downwardly. Another type of flowing art article provides at least two colored liquids with different specific gravities. When a user turns the sandglass-like container upside down, the heavy liquid will sink and the light liquid will float. However, these conventional flowing art articles which are often in single piece cannot be assembled together to form an art article assembly with stacked color filters.

SUMMARY OF THE PRESENT INVENTION

The main object of the present invention is to provide a kinetic art article assembly with stacked color filters so that a plurality of stacked color filters can be assembled together to show various colors at different time.

Another object of the present invention is to provide a kinetic art article assembly with stacked color filters which can be turned upside down or rotated intermittently.

The kinetic art article assembly with a stacked color filters has at least a plate assembly which comprises a plurality of plates to show various colors. A drive mechanism can turn a cylindrical main body upside down or rotate the cylindrical main body intermittently.

DESCRIPTION OF THE PREFERRED EMBODIMENT

Figure 1:
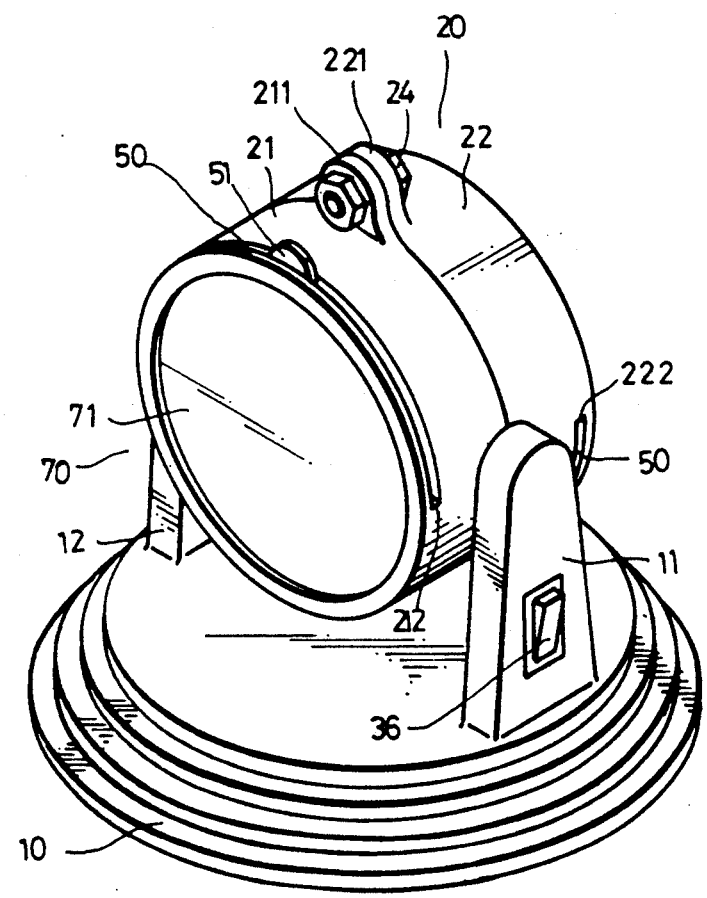
FIG. 1 is a perspective, assembly view of a kinetic art article assembly with stacked color filters of a preferred embodiment in accordance with the present invention.
Figure 2:
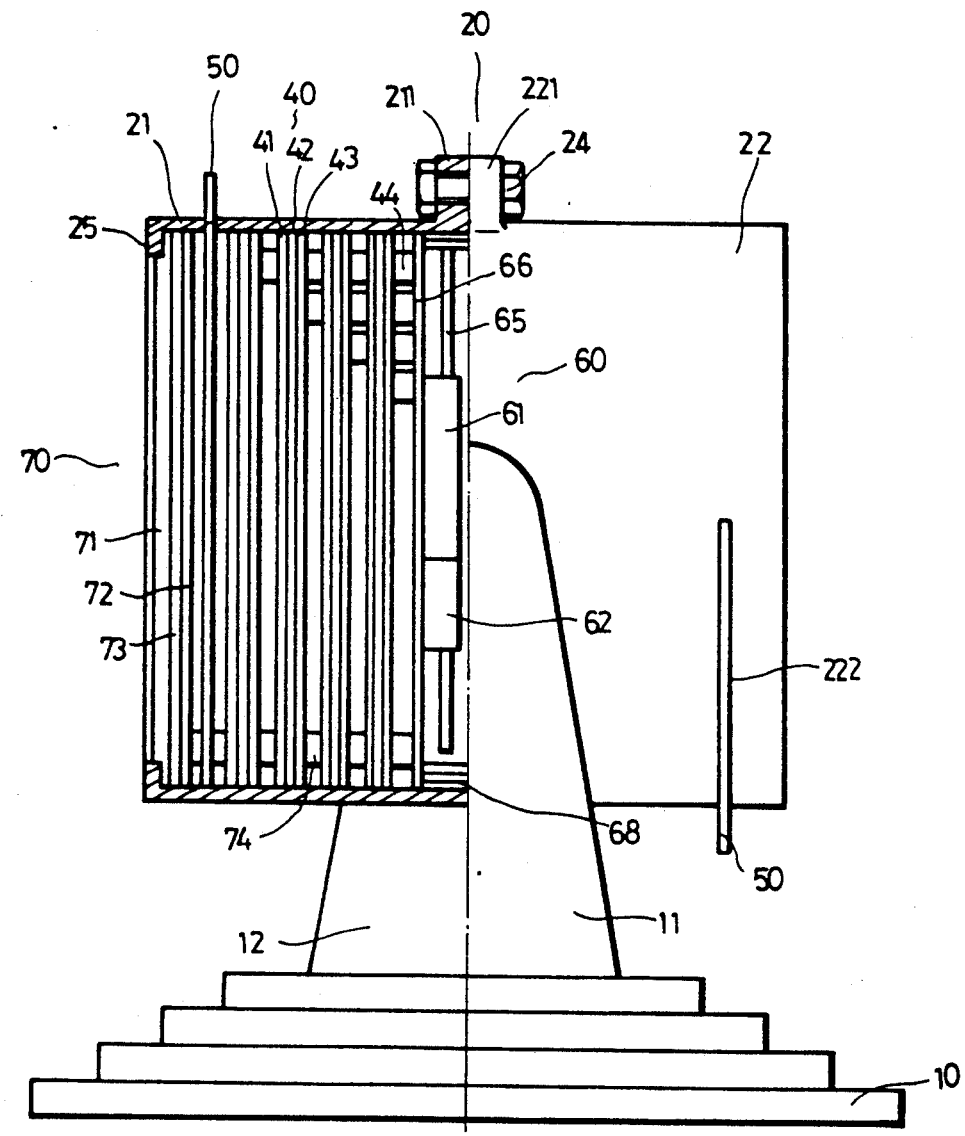
FIG. 2 is a partly cross-sectional view of FIG. 1.
Figure 3:
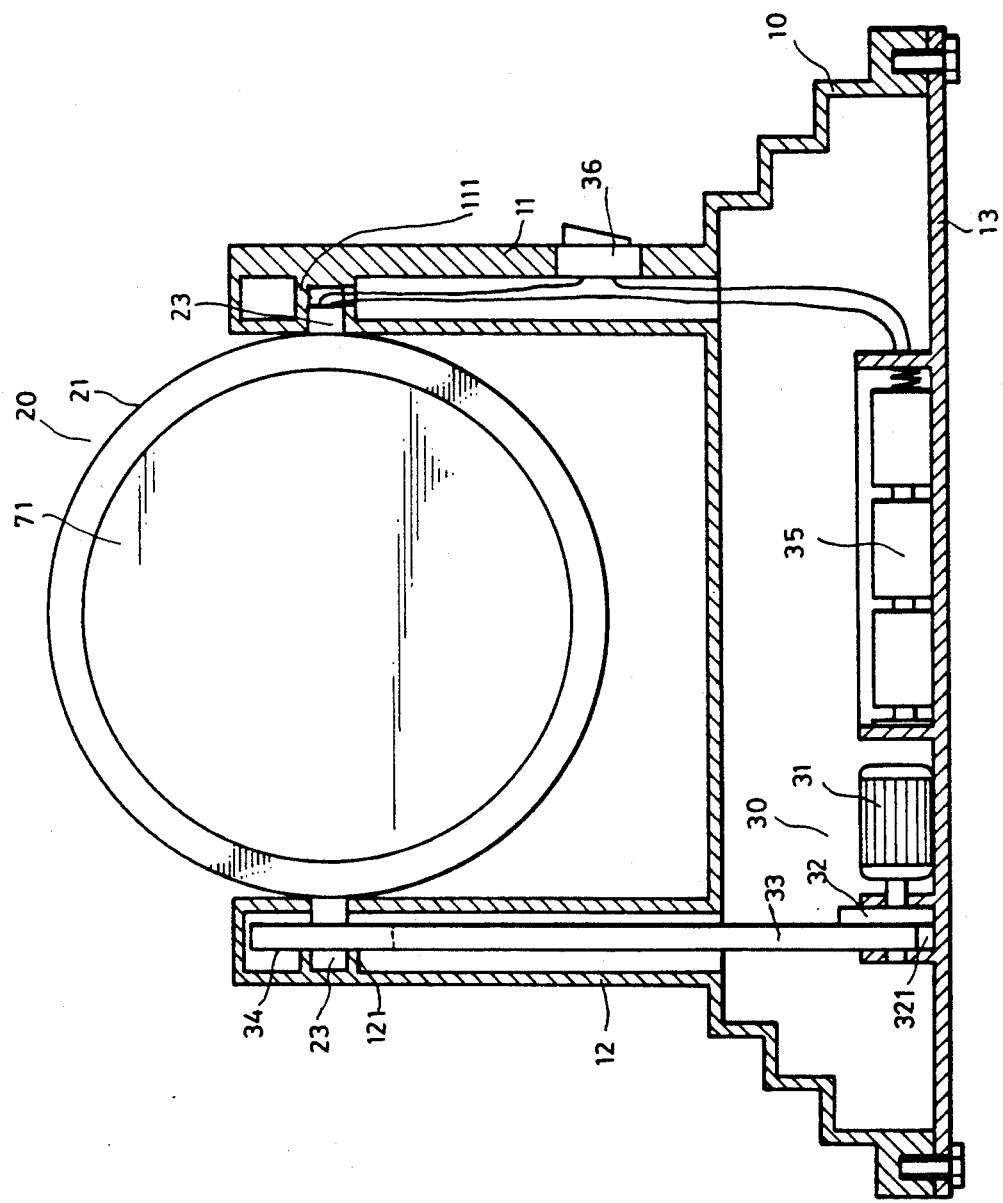
FIG. 3 is a cross-sectional view of a terrace-shaped base of a preferred embodiment in accordance with the present invention.
Figure 4:
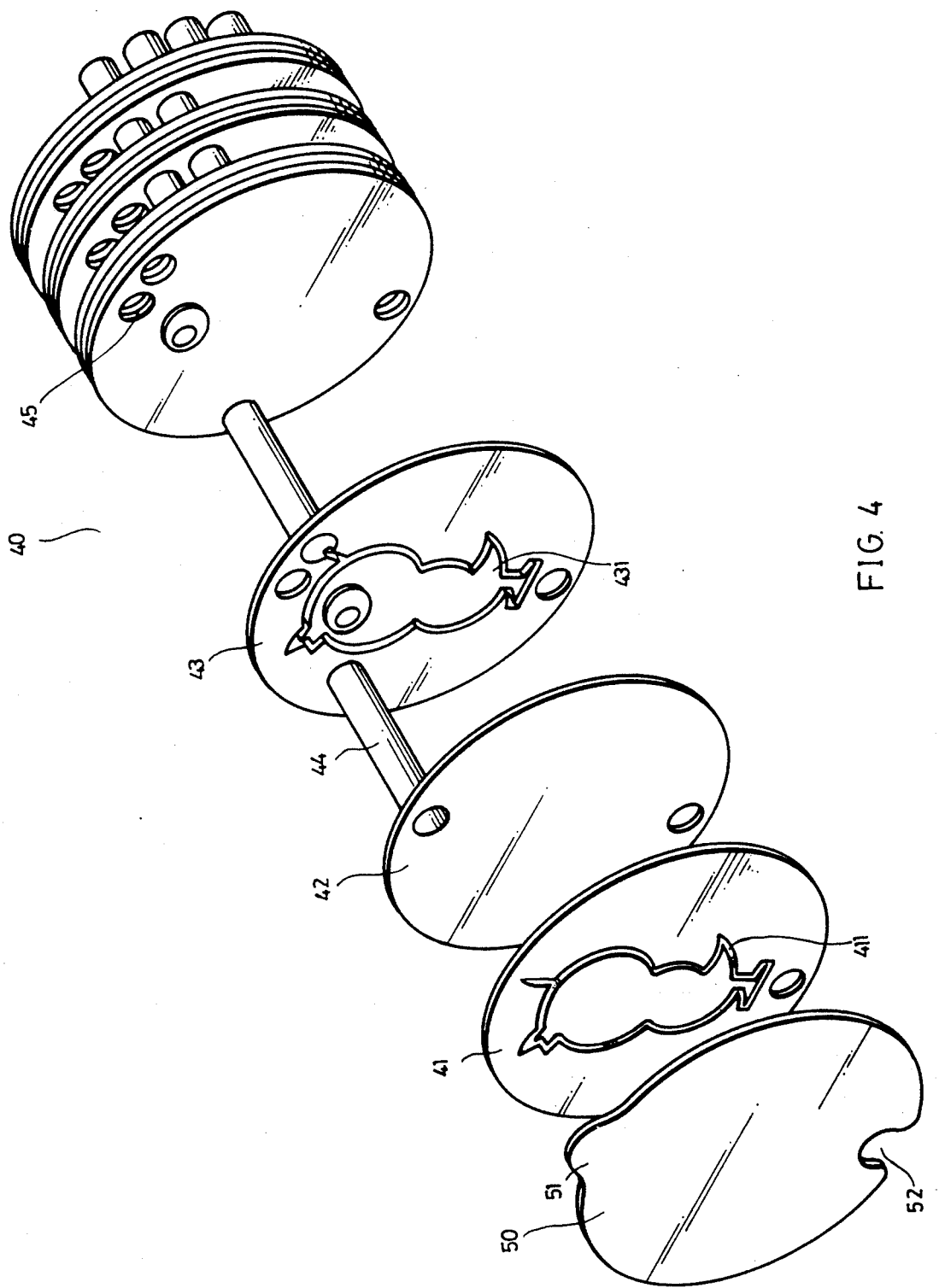
FIG. 4 is a partly exploded view of a plate assembly of a preferred embodiment in accordance with the present invention.

Referring to FIGS. 1 to 3, a kinetic art article assembly with stacked color filters comprises a terrace-shaped base 10, a cylindrical main body 20, a drive mechanism 30, and at least a plate assembly 40 according to a preferred embodiment of the present invention. Two opposite support plates 11, 12 which are disposed on the base 10 respectively are used for supporting the cylindrical main body 20 pivotally. The cylindrical main body 20 comprises a front main body 21 and a rear main body 22. Two securing lobes 211, 221 which are disposed on the top of each main body 21, 22 respectively are secured toghther by a bolt 24. Each main body 21, 22 has two pivots 23 extending transversely from the central, outer periphery of each main body 21, 22 respectively. The corresponding pivots 23 of each main body 21, 22 are inserted in the pivot holes 111, 121 of the support plates 11, 12 respectively. Each pair of the corresponding pivots 23 are surrounded by a sprocket wheel 34 so that the corresponding pivots 23 become the axle of the sprocket wheel 34. The sprocket wheel 34 is connected to a pulley belt 33. A drive mechanism 30 comprises a motor 31, a pinion 32, a pulley belt 33 and a sprocket wheel 34. The motor 31 drives the pinion 32 which is connected to a sprocket wheel 321. The sprocket wheel 321 is connected to the pulley belt 33. The drive mechanism 30 is disposed on the flat bottom plate 13 of the base 10. The battery unit 35 supplies electric power for the drive mechanism 30. A switch 36 which is disposed in the support plate 11 is connected to a fluid governor 60 in the cylindrical main body 20 and the batery unit 35 by wires.

Referring to FIGS. 1 to 6, each main body 21 or 22 comprises at least one plate assembly 40. The plate assembly comprises a front plate 41, a flat plate 42, and a rear plate 43. The front plate 41 has a recess 411 therein, and the rear plate 43 has corresponding recesses 431 therein. A tube 44 is disposed on the rim of the flat plate 42 and the rear plate 43. A hole 45 on each plate 41, 42, 43 of the front main body 21 is for the tubes 44 of the rear main body 22 passing through so that a plurality of plate assembly 40 can be connected. Each tube 44 receives a colored liquid, and different tubes 44 receive liquids with different colors. The liquid can flow from the tube 44 into the recess 411 so that the recess 411 is full of liquid. When the cylindrical main body 20 is turned upside down by the drive mechanism 30, the liquid in the recess 411 will flow into the tube 44. Therefore, the colored pattern in the front plate 41 will disappear.

Figure 5:
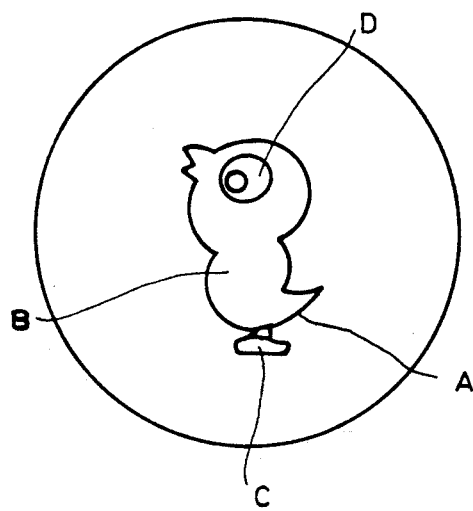
FIG. 5 is a front view of a plate assembly without insertion plate in FIG. 4.

Since the tubes 44 in the front main body 21 are disposed on the top portion of the plates 42, 43 and the tubes 44 in the rear main body 22 are disposed on the bottom portion of the plates 42, 43, the tubes 44 in the front main body 21 and the tubes 44 in the rear main body 22 will change their positions after the cylindrical main body 20 is turned upside down. Therefore, the liquid in the recess 411 will flow into the tube 44 of the front main body 21 and the liquid in the tube 44 of the rear main body 22 will flow in to the recess 411. When the patterns in the front main body 21 begins to disappear, the patterns in the rear main body 22 begins to appear. Therefore, the patterns change colors if the user looks the patterns at the front of the cylindrical main body 20 or at the back of the cylindrical main body 20. The patterns are illustrated in FIG. 5, and A, B, C and D shows different parts of the patterns with different colors.

Figure 6:
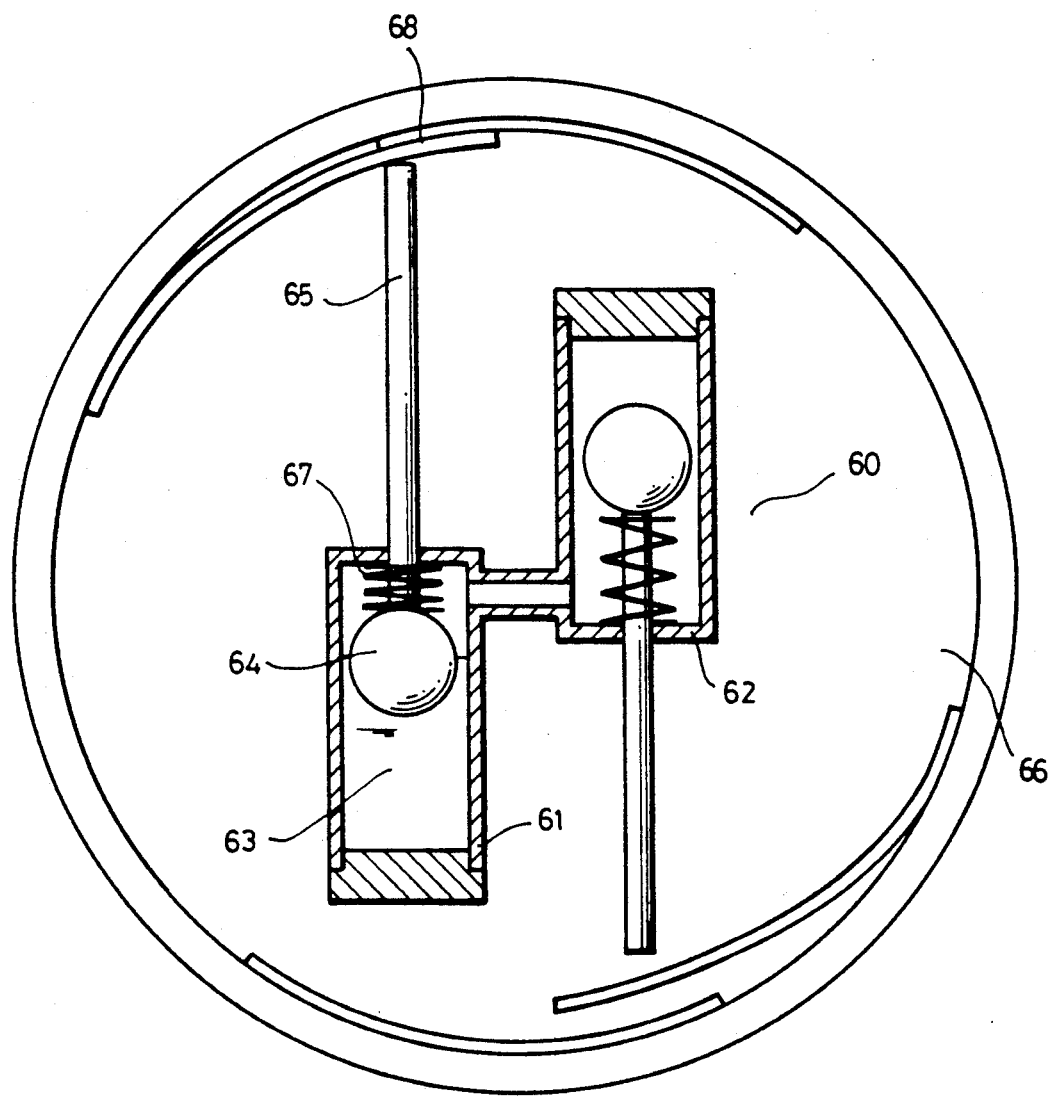
FIG. 6 is a partly cross-sectional view of a fluid governer of a preferred embodiment in accordance with the present invention.

Referring to FIGS. 2 and 6, a fluid governor 60 comprises two containers 61, 62, a liquid 63, two floats 64, two actuating rods 65, a plate 66, and two conductor plates 68. The fluid governor 60 is disposed in the cylindrical main body 20 so that the fluid governor 60 cannot be seen from the outer appearance of the fluid governor 60. The two containers 61, 62 are connected toghther so that the liquid 63 can flow into either container 61, 62. The containers 61, 62 are attached to the plate 66. When the liquid 63 flows into the container 61, the float 64 will begin to float and the actuating rod 65 will touch the conductor plate 68. Thus the conductor plate 68 controls the motor 31 to rotate in one direction, and the cylindrical main body 20 begins to turn upside down. The liquid 31 will flow from the container 61 into the container 62 spontaneously, and the float 64 of the container 61 begin to descend. Since a spring 67 is disposed between the float 64 and the container 61, the rod 65 will not touch the conductor plate 68. When the rod 65 of the container 62 touches the conductor plate 68, the conductor plate 68 will control the motor 31 to rotate in the opposite direction.

Referring to FIGS. 1 to 4, a window plate 70 is disposed in the front of the front main body 21 and another window plate 70 is disposed in the back of the rear main body 22. Each window plate 70 contains an outer plate 71 and an inner plate 72. A space 73 is formed between the outer plate 71 and the inner plate 72. A tube 74 contains a liquid with deep color which can flow into the tube 74. The tube 74 is disposed at the opposite position of the tube 44. When the patterns of the front main body 21 disappear, the liquid with deep color will flow into the space 73. A semi-circular slot 212, 222 is disposed at the outer periphery of each main body 21, 22 respectively so that an insertion plate 50 can be inserted throught the slot 212, 222. The insertion plate 50 is disposed between the inner plate 72 and the plate assembly 40. The insertion plate 50 has a protrusion 51 in one side to be held by the user and a recess 52 in the opposite side to be inserted by the tube 74. The user can write words or draw pictures on the insertion plate 50. However, the use of the insertion plate 50 is optional.

Figure 9:
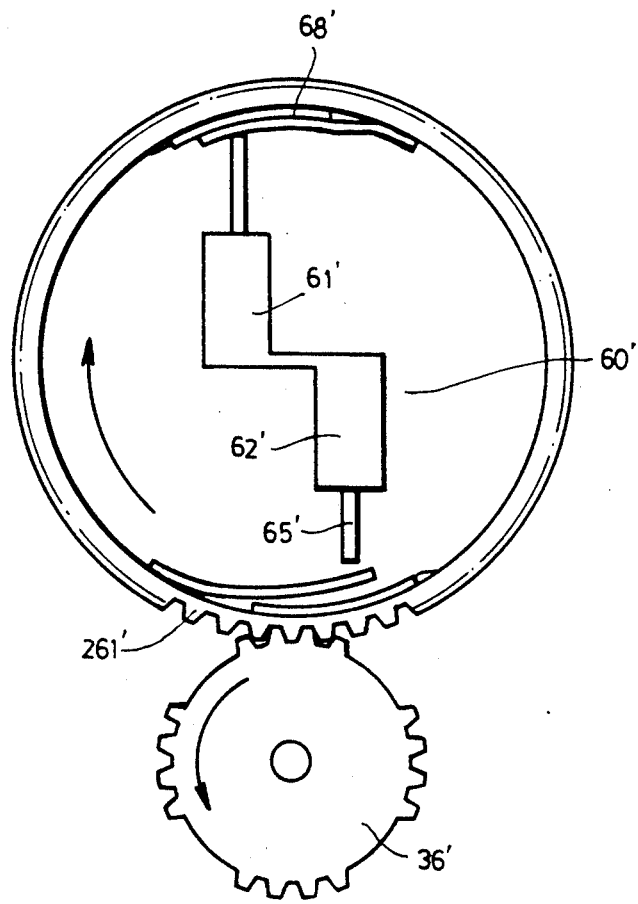
FIG. 9 is a schematic view of a fluid governer of another preferred embodiment in accordance with the present invention.
Figure 7:
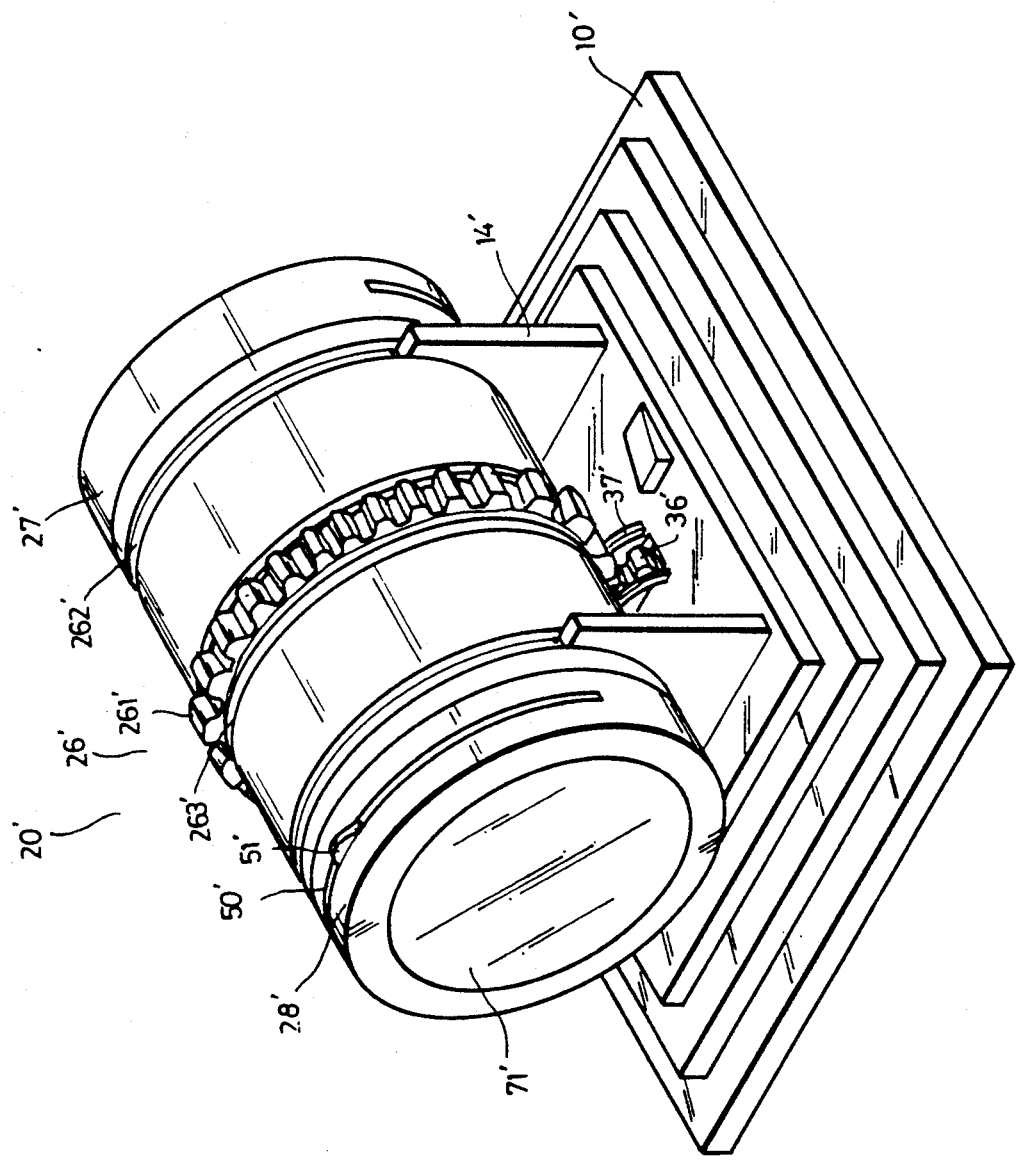
FIG. 7 is a perspective, assembly view of a kinetic art article assembly with stacked color filters of another preferred embodiment in accordance with the present invention.
Figure 8:
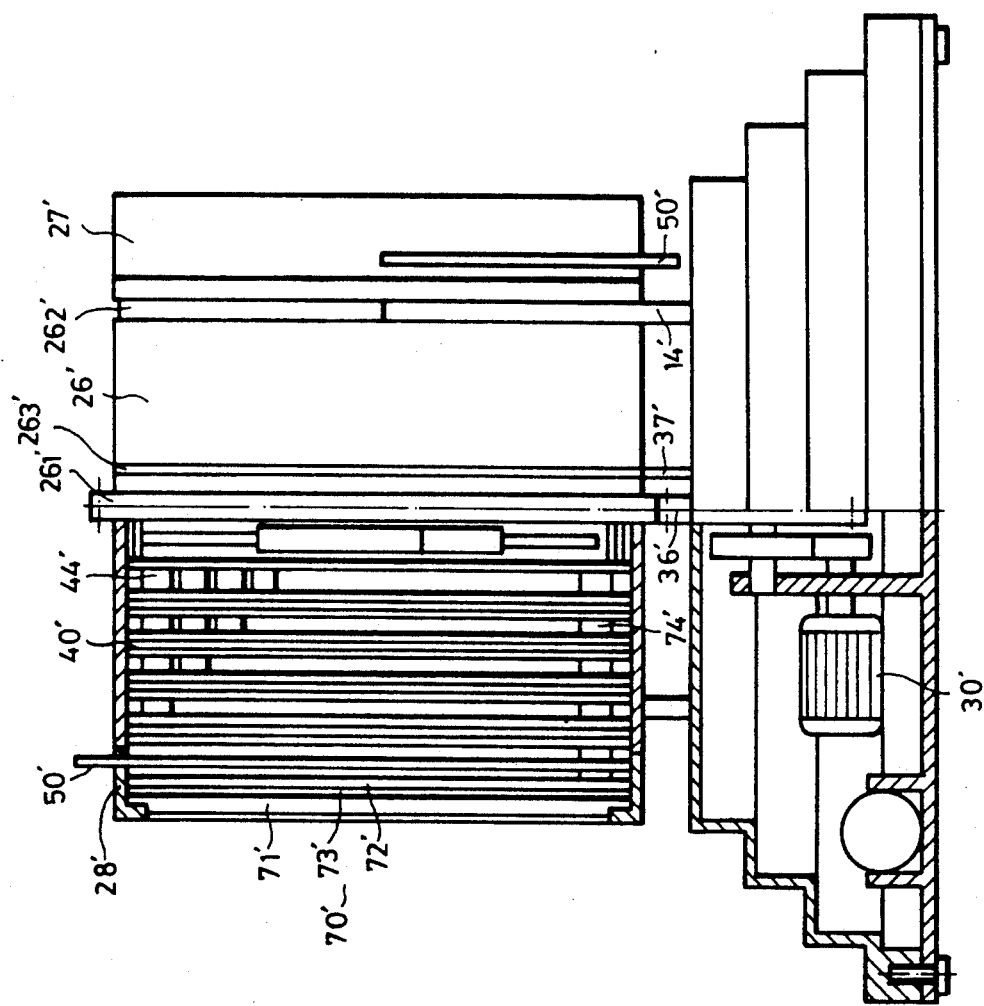
FIG. 8 is a partly cross-sectional view of FIG. 7.

Another preferred embodiment is shown in FIGS. 7 to 9. A kinetic art article assembly with stacked color filters comprises a rectangular stepped base 10', a cylindrical main body 20' with a front main body 28', a rear main body 27' and a central body 26', a drive mechanism 30', a fluid governor 60', at least a set of plate assembly 40' in the main body 28' or 27', a window plate 70', and an insertion plate 50'. Each main body 28', 27' has a recess 262' to be inserted by a support plate 14'. Two support plates 14' are disposed on the top surface of the base 10'. A drive gear 261' is disposed on the outer periphery of the central body 26'. The drive gear 261' is disposed between two metal rings 263' which are connected to the fluid governor 60'. Two contact plates 37' are disposed below the cylindrical main body 20' to protect a pinion 36' which is driven by a motor 30' can intermeshed with the drive gear 261'. Since the pinion 36' has smooth area between each set of teeth, the cylindrical main body 20' can be rotated intermittently. Two window plates 70' are disposed on the outer surface of the main bodies 28', 27' respectively. Two insertion plates 50' with protrusions 51' are disposed in the main bodies 28', 27' respectively. Each window plate 70' has an outer plate 71' and an inner plate 72' to form a space 73'. Each plate assembly 40' has a plurality of tubes 44' thereon. The fluid governor 60' comprises two containers 61', 62', two actuating rods 65', and two conductor plates 68'. The operation of the fluid governor 60' is similar to the operation of the fluid governer 60 in the first preferred embodiment.

I claim:

1. A kinetic art article assembly with stacked color filters comprising:

a base;

two support plates on the top of said base;

a cylindrical main body supported by said two support plates;

a front main body and a rear main body defined by said cylindrical main body;

a fluid governor disposed in said cylindrical body and between said front main body and said rear main body;

a drive mechanism disposed in said base for controlling the motion of said cylindrical main body;

at least a plate assembly disposed in said front main body and said rear main body;

said plate assembly comprising a front plate, a flat plate, and a rear plate;

said front plate having a first recess therein;

said rear plate having a corresponding second recess therein;

a first tube disposed on the rim of said flat plate with a liquid capable of flowing from said first tube to said first recess;

a second tube disposed on the rim of said rear plate with a liquid capable of flowing from said second tube to said second recess;

Wherein each of said front plate, flat plate, and rear plate of said front main body has a hole being passed through by said correcponding tubes of said rear main body and each of said front plate, flat plate, and rear plate of said rear main body has a hole being passed through by said corresponding tubes of said front main body.

2. A kinetic art article assembly with stacked color filters as claimed in claim 1, wherein said drive mechainsm comprises a motor, a pinion, a pulley belt and a sprocket wheel, wherein two pivots which extend from the central portion of said cylindrical main body are surrounded by said sprocket wheel which is connected to said pulley belt, and wherein said motor drives said pinion which is connected to said sprocket wheel.

3. A kinetic art article assembly with stacked color filters as claimed in claim 1, wherein said drive mechanism comprises a drive gear disposed on the central, outer periphery of said cylindrical main body, a pinion intermeshed with said drive gear, and a motor to drive said pinion.

4. A kinetic art article assembly with stacked color filters as claimed in claim 1, wherein said fluid governor comprises two conductor plates, and a first container and a second container with a liquid therein, wherein each container has an actuating rod connected to a float with a spring disposed between said float and said container, and wherein said conductor plate actuates said motor to rotate if said conductor plate is touched by said actuating rod.

5. A kinetic art article assembly with stacked color filters as claimed in claim 1 wherein said fluid governor comprises two conductor plates, and a first container and a second container with a liquid therein, wherein each container has an actuating rod connected to a float with a spring disposed between said float and said container, and wherein said conductor plate actuates said motor to rotate when said conductor plate is touched by said actuating rod.

* * * * *